(12) United States Patent
Yanagita et al.

(10) Patent No.: US 7,247,860 B2
(45) Date of Patent: Jul. 24, 2007

(54) RADIATION DETECTION MODULE, RADIATION DETECTOR AND RADIOLOGICAL IMAGING APPARATUS

(75) Inventors: Norihito Yanagita, Hitachi (JP); Katsutoshi Tsuchiya, Hitachi (JP); Hiroshi Kitaguchi, Naka-machi (JP); Kensuke Amemiya, Hitachinaka (JP); Yuuichirou Ueno, Hitachi (JP); Kazuma Yokoi, Hitachi (JP); Akihito Kitajima, Gushikawa (JP)

(73) Assignees: Hitachi, Ltd., Tokyo (JP); Acrorad Co., Ltd., Gushikawa-shi, Okinawa (JP)

( * ) Notice: Subject to any disclaimer, the term of this patent is extended or adjusted under 35 U.S.C. 154(b) by 315 days.

(21) Appl. No.: 11/075,769

(22) Filed: Mar. 10, 2005

(65) Prior Publication Data

US 2005/0230630 A1 Oct. 20, 2005

(30) Foreign Application Priority Data

Mar. 11, 2004 (JP) .............................. 2004-068954

(51) Int. Cl.
*H01L 27/00* (2006.01)
(52) U.S. Cl. ..................... 250/370.09; 250/370.08; 250/370.01
(58) Field of Classification Search ........... 250/370.09, 250/370.08, 370.01
See application file for complete search history.

(56) References Cited

U.S. PATENT DOCUMENTS

| | | | |
|---|---|---|---|
| 4,700,076 A | | 10/1987 | Dorman et al. |
| 4,937,453 A | * | 6/1990 | Nelson .................. 250/370.09 |
| 5,907,156 A | | 5/1999 | Nishizawa et al. |
| 6,235,051 B1 | | 5/2001 | Murphy |
| 6,236,051 B1 | * | 5/2001 | Yamakawa et al. ...... 250/370.1 |
| 2003/0010924 A1 | * | 1/2003 | El-Hanany et al. .... 250/370.09 |
| 2005/0067574 A1 | * | 3/2005 | Yokoi et al. ........... 250/370.01 |
| 2005/0156114 A1 | * | 7/2005 | Yokoi et al. ........... 250/370.09 |
| 2006/0086907 A1 | * | 4/2006 | Yokoi et al. ........... 250/370.09 |
| 2006/0186341 A1 | * | 8/2006 | Ueno et al. ............. 250/363.05 |

FOREIGN PATENT DOCUMENTS

| | | |
|---|---|---|
| EP | 0642178 A2 | 8/1994 |
| EP | 06-42-178 | 3/1995 |
| JP | A-60-196692 | 10/1985 |
| JP | 7-122776 | 5/1995 |
| JP | A-11-281747 | 10/1999 |
| JP | A-11-304930 | 11/1999 |
| JP | A-11-337646 | 12/1999 |
| JP | 2003-84068 | 3/2003 |
| JP | 2003-167058 | 4/2003 |
| JP | A-2003-218505 | 7/2003 |

* cited by examiner

*Primary Examiner*—David Porta
*Assistant Examiner*—Christine Sung
(74) *Attorney, Agent, or Firm*—Dickstein Shapiro LLP

(57) ABSTRACT

A radiation detection module and radiological imaging apparatus capable of improving spatial resolution. A semiconductor radiation detector includes a plurality of semiconductor radiation detector elements and conductive members which are copper plates. A detector element provides an anode electrode on one of facing sides of a semiconductor region and a cathode electrode on the other side. The respective detector elements are arranged in parallel in such a way that the cathode electrodes and anode electrodes face each other respectively, and the anode electrodes are electrically connected together and the cathode electrodes are electrically connected together via the conductive members respectively.

33 Claims, 7 Drawing Sheets

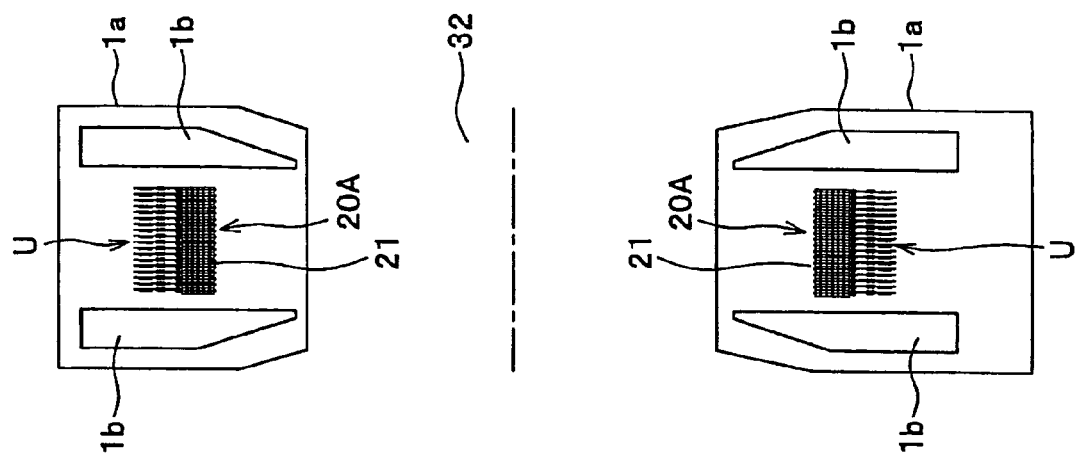
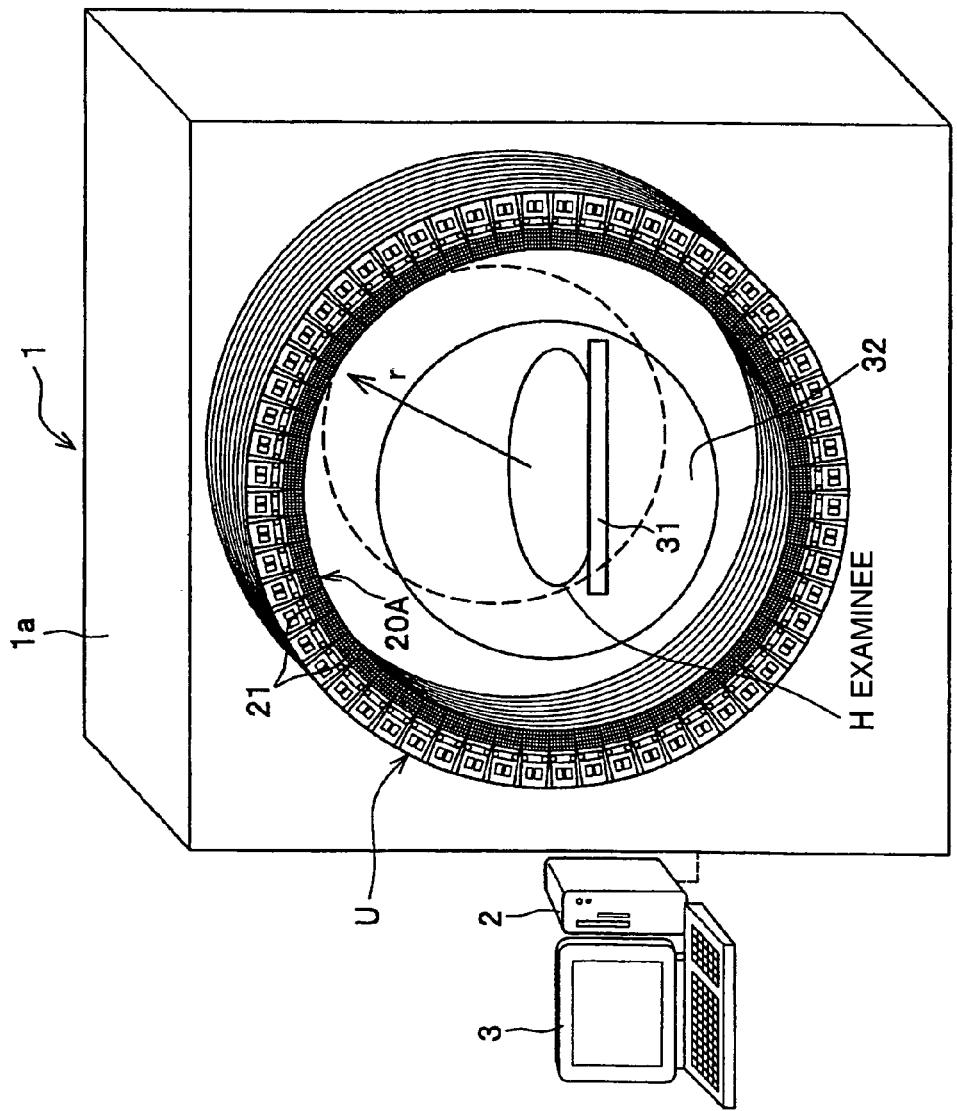

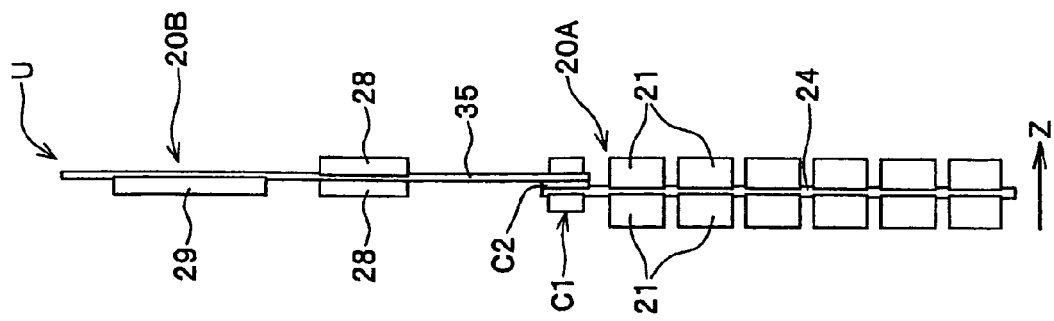
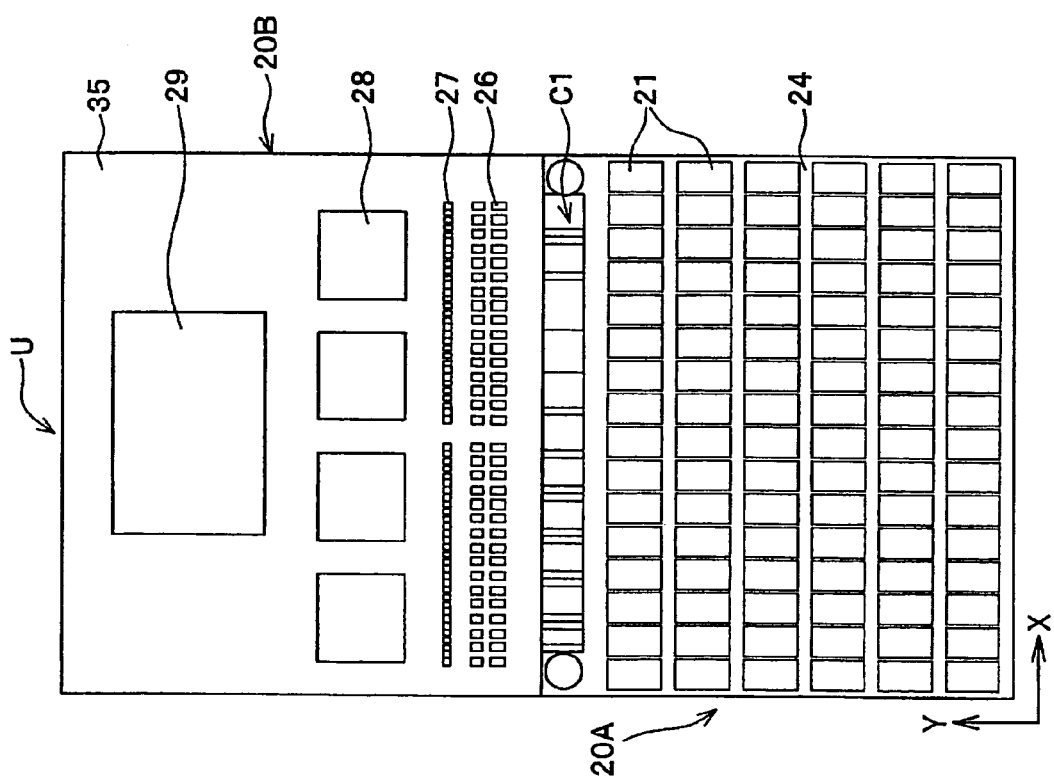

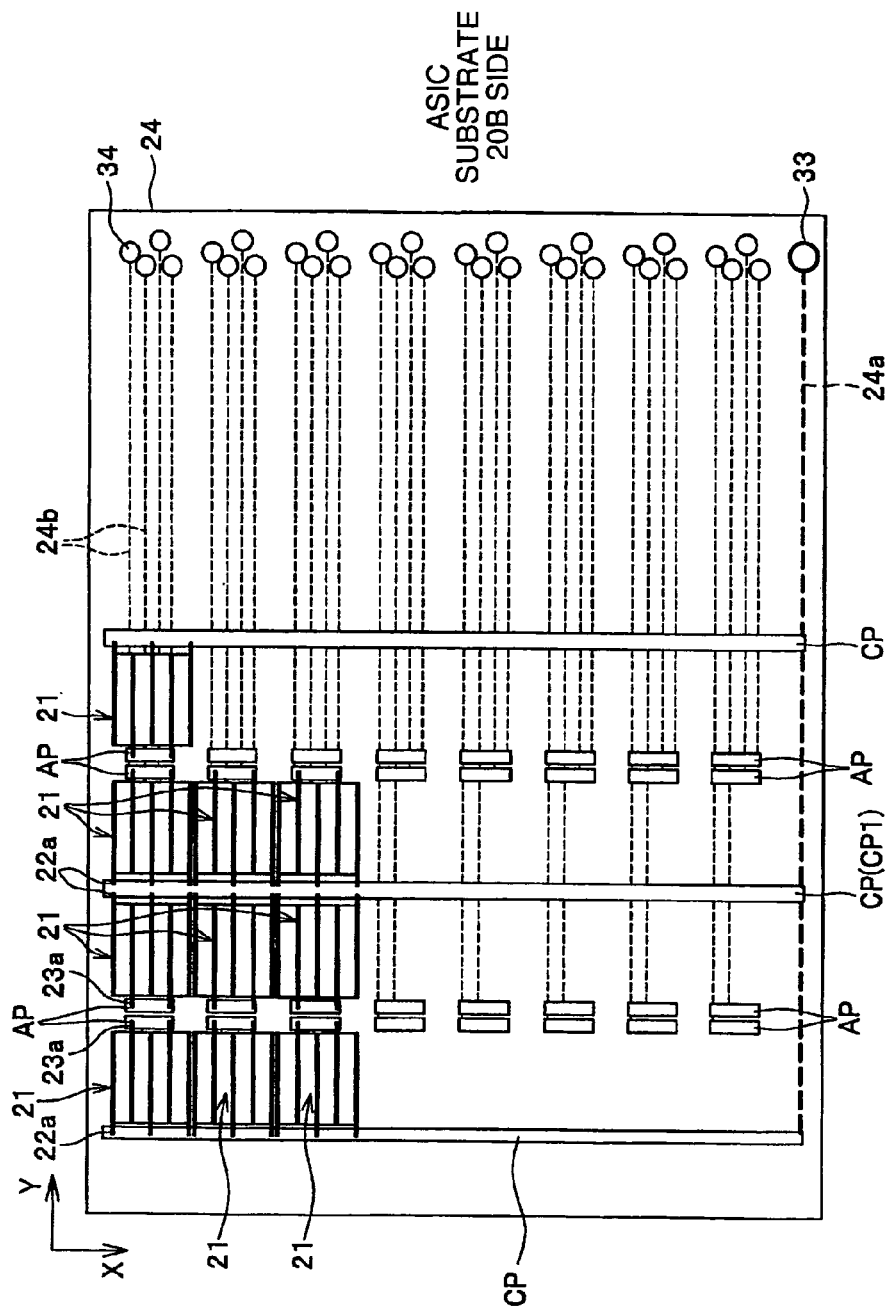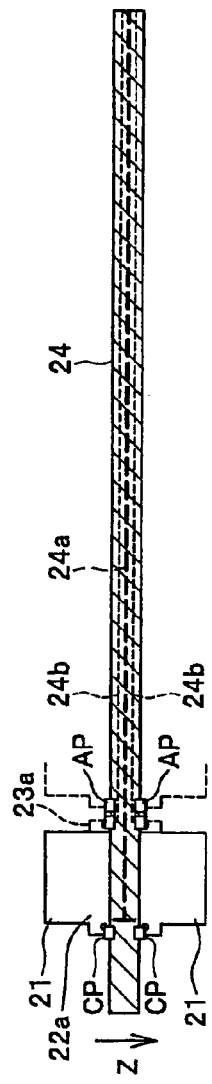
FIG. 4A
FIG. 4B

RADIATION DETECTION MODULE, RADIATION DETECTOR AND RADIOLOGICAL IMAGING APPARATUS

BACKGROUND OF THE INVENTION

The present invention relates to a radiation detection module, radiation detector and radiological imaging apparatus, and more particularly, to a radiation detection module, radiation detector and radiological imaging apparatus using semiconductor radiation detector elements.

As an example of conventional radiation detectors which detect radiation such as γ-rays, there is a semiconductor radiation detector provided with a semiconductor radiation detector element (hereinafter referred to as "detector element") made of a semiconductor material such as CdTe (cadmium telluride), CdZnTe (cadmium zinc telluride), TlBr (thallium bromide), GaAs (gallium arsenide). Since the detector element converts charges produced by interaction between radiation and the semiconductor material to an electric signal, the semiconductor radiation detector is characterized by higher efficiency of conversion into an electric signal than a radiation detector using a scintillator and its ability to be miniaturized.

The semiconductor radiation detector is provided with the aforementioned detector element and electrodes formed on both surfaces facing this detector element. By applying a DC high voltage between these electrodes, the semiconductor radiation detector collects charges generated when radiations such as X-rays, γ-rays enter the detector element as signals from the electrodes.

When the semiconductor radiation detector is used for a medical radiation imaging apparatus (radiological imaging apparatus), etc., a semiconductor radiation detector is connected to a wiring board to form a radiation detection section (e.g., see JP-A-2003-84068 (paragraph 0024, FIG. 3)). Furthermore, a technology which arranges a plurality of semiconductor radiation detectors on a radiation detector support board is proposed (e.g., see JP-A-2003-167058 (paragraphs 0020 and 0021, FIG. 3)).

SUMMARY OF THE INVENTION

There is a demand for a PET (Positron Emission Tomography) apparatus which is a kind of radiological imaging apparatus, with enhanced spatial resolution to obtain images with a high degree of accuracy. There is also a demand for a PET imaging apparatus with improved γ-ray detection sensitivity, for example, enhanced arrangement density of the radiation detector in order to shorten inspection time. These demands also apply to a SPECT (Single Photon Emission Tomography) apparatus and other radiological imaging apparatuses such as a γ-camera.

It is an object of the present invention to provide a radiation detection module, radiation detector and radiological imaging apparatus capable of improving spatial resolution.

In order to attain the above-described object, the radiation detector according to a first invention comprises a plurality of radiation detector elements including a semiconductor region, a first electrode which collects a radiation detection signal and a second electrode which applies a bias voltage, both of which face each other with the semiconductor region interposed in between, the semiconductor region being disposed so as to cross a support substrate to which the radiation detector is attached, wherein the radiation detector elements are arranged with the electrodes of the same type arranged in parallel facing each other, conductive members are arranged between the mutually facing electrodes of the same type and attached to these electrodes and the conductive members are attached to a first support substrate by being connected to wiring provided for the first support substrate.

In this way, the conductive members are used as fixing members to attach the radiation detectors to the support substrate. This eliminates the necessity for any other fixing member to attach the radiation detectors to the support substrate and can improve arrangement density of radiation detectors on the support substrate. This also leads to an improvement in spatial resolution of an image obtained from the examinee.

In a second invention, the support substrate includes a plurality of first conductive connection members to which a first conductive member, which is a conductive member connected to a first electrode, is attached and a plurality of conductive second connection members to which a second conductive member, which is a conductive member connected to a second electrode, is attached, and the first connection members are arranged in two parallel rows between the second electrode connection members in one direction. In this way, in the one direction, the respective first conductive members connected to the electrodes of the same type of the neighboring radiation detectors are connected to the respective first connection members arranged in two parallel rows between the second electrode connection members. Therefore, it is possible to reduce mutual electrical insulation among the radiation detectors in the one direction and narrow the distances among the radiation detectors in the one direction. This also makes it possible to improve the arrangement density of the radiation detectors on the support substrate and to improve spatial resolution of an image obtained.

The present invention can improve spatial resolution.

Other objects, features and advantages of the invention will become apparent from the following description of the embodiments of the invention taken in conjunction with the accompanying drawings.

BRIEF DESCRIPTION OF THE DRAWINGS

FIG. 1A is a schematic perspective view of the structure of a PET imaging apparatus of Embodiment 1 which is a preferred embodiment of the present invention and FIG. 1B is a view of the PET imaging apparatus in FIG. 1A along the longitudinal direction of a bed;

FIG. 2A is a front view of the unit substrate used for the PET imaging apparatus shown in FIG. 1A, 1B and FIG. 2B is a side view of the unit substrate;

FIG. 4A schematically illustrates an arrangement of a plurality of radiation detectors on the radiation detection module in FIG. 2A and FIG. 4B is a cross-sectional view of the radiation detection module;

DESCRIPTION OF THE EMBODIMENTS

Figure 3A:
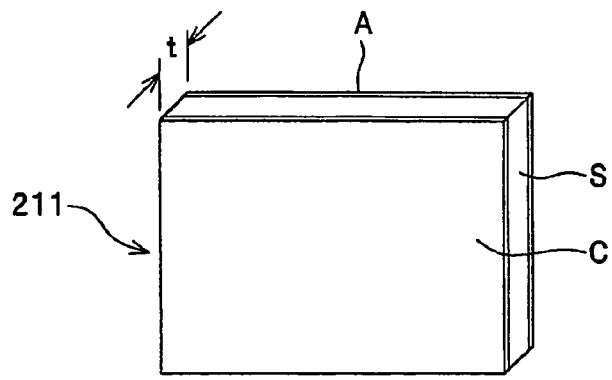
FIG. 3A is a schematic perspective view of the semiconductor radiation detector element.

Next, a PET imaging apparatus which is a radiological imaging apparatus and a preferred embodiment of the present invention will be explained with reference to the attached drawings as appropriate in detail below.

Embodiment 1

As shown in FIG. 1A, 1B, the PET imaging apparatus of this embodiment is provided with a PET imaging apparatus 1, a bed 31 which holds an examinee H, a data processing apparatus (computer, etc.) 2 and a display apparatus 3. The PET imaging apparatus 1 includes many unit substrates U shown in FIG. 2 arranged in circumferential direction. In the PET imaging apparatus 1, the examinee H is laid on a bed 31 which is movable in the longitudinal direction and inserted into a measuring space 32 surrounded by the unit substrates U.

(PET Imaging Apparatus)

The PET imaging apparatus 1 includes many unit substrates U arranged in the circumferential direction surrounding the measuring space 32 into which the bed 31 is inserted. A plurality of unit substrates U are also arranged in the longitudinal direction (axial direction of the measuring space 32) of the bed 31. As shown in FIG. 2A, 2B, the unit substrate U includes a radiation detection module (hereinafter referred to as "detection module") 20A and an integrated circuit substrate (hereinafter referred to as "ASIC substrate") 20B. The detection module 20A is provided with a plurality of semiconductor radiation detectors (hereinafter simply referred to as "detectors") 21. The detectors 21 detect γ-rays emitted from within the body of the examinee H. The ASIC substrate 20B includes integrated circuits (ASIC) for measuring peak values and detection time of detected γ-rays, designed to measure peak values and detection time of detected radiations (γ-rays). The integrated circuit includes a plurality of signal processing apparatuses which process radiation detection signals.

Next, details of the PET imaging apparatus 1 will be explained.

(Semiconductor Radiation Detector)

Figure 3B:
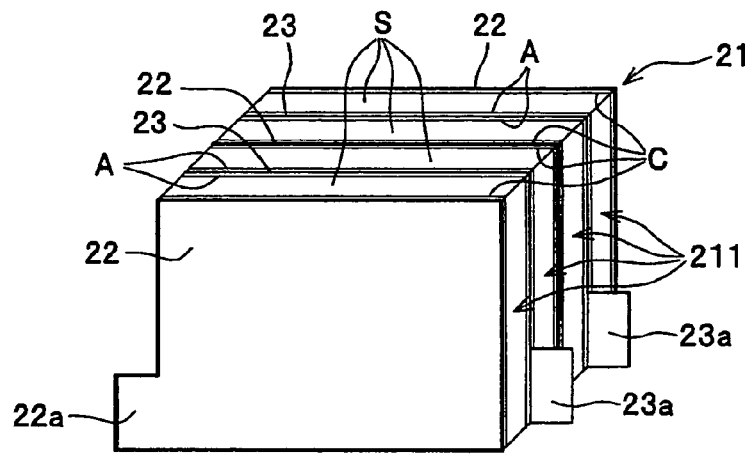
FIG. 3B is a perspective view of the radiation detector using a semiconductor radiation detector element provided for the unit substrate and FIG. 3C schematically illustrates the radiation detector placed on a wiring board.

First, the detector 21 applied to this embodiment will be explained first. As shown in FIG. 3B, the detector 21 includes a plurality of semiconductor radiation detector elements (hereinafter referred to as "detector elements," see FIG. 3A) 211 including semiconductor regions (semiconductor sections) S, made up of a tabular semiconductor material, and conductive members (fixing members) 22, 23. The detector element 211 forms thin film-like electrodes on the two entire surfaces facing the semiconductor region S using a vapor deposition method, etc. The electrode formed on one surface is an anode electrode (first electrode, hereinafter referred to as "anode") A and the electrode formed on the other surface is a cathode electrode (second electrode, hereinafter referred to as "cathode") C. The detector 21 arranges an even number (e.g., four) of vertically positioned detector elements 211 in parallel in such a way that the cathodes C face each other and the anodes A face each other and the electrodes of the same type (the anodes A and cathodes C) are electrically connected through the conductive members 22, 23 (see FIG. 3B). That is, the conductive member 23 (first conductive member) is interposed between the mutually facing anodes A of a pair of neighboring detector elements 211 and attached to the respective anodes A using a conductive adhesive 25. The conductive member 22 (second conductive member) is interposed between the mutually facing cathodes C of another pair of neighboring detector elements 211 and attached to the respective cathodes C using a conductive adhesive. Furthermore, the conductive members 22 are bonded to the respective cathodes C placed at both ends of the detector 21. In the detector 21, the anodes A and cathodes C are placed alternately and the conductive members 22 and conductive members 23 are also placed alternately.

The semiconductor region S is a region which interacts with radiation to generate charge and is formed of any one single crystal of CdTe, CdZnTe, TlBr, GaAs, etc. Furthermore, for the cathode C and anode A, any one material of Pt, Au, In, etc., is used. The detector element 211 in this embodiment uses the cathode C whose principal ingredient is CdTe, Pt for the semiconductor region S and the anode A whose principal ingredient is In, forming a pn junction diode.

Here, a relationship between a time and peak value curve when the thickness t (see FIG. 3A) of the semiconductor region S is thick and thin will be explained. When a backward bias voltage (hereinafter referred to as "bias voltage") of pn junction applied between the cathode C and anode A is the same, the semiconductor region S having a smaller t has a quicker rise of a peak value and has a higher degree of accuracy (energy resolution) of the peak value. When the rising speed of the peak value is high, for example, the accuracy of simultaneous measurement (coincidence resolution) of the PET imaging apparatus 1 improves. As the rising speed of the peak value increases, the energy resolution of the semiconductor region S having a smaller thickness t increases (the efficiency of charge collection improves) because the time required for electrons to reach the anode A and the time required for holes to reach the cathode C are shortened, that is, the charge collection time is shortened. Furthermore, holes which are likely to be annihilated in midstream can reach the cathode C without being annihilated because of the small thickness. The thickness t can also be expressed as a distance between the mutually facing cathode C and anode A. The anode A is the electrode to extract a radiation detection signal and the cathode C is the electrode to apply a bias voltage.

Furthermore, the thickness (distance between the electrodes) t of the semiconductor region S is preferably 0.2 mm to 2 mm. This is because when the thickness t exceeds 2 mm, the rising speed of a peak value slows down and a maximum value of the peak value also decreases. Even if the thickness t is increased, it is possible to increase the moving speed of electrons and holes by increasing the bias voltage and increasing the electric field strength in the thickness direction in the detector element 211 to thereby shorten the time for electrons and holes to reach the electrodes. However, increasing the bias voltage to be applied involves an increase in the size of a DC voltage power supply and may produce a harmful effect of causing dielectric breakdown inside the wiring board (support substrate) 24, and is therefore not preferable. On the other hand, when the thickness falls below 0.2 mm, the thickness (volume) of the electrodes (cathode C, anode A) relatively increases. This results in a reduced proportion of the semiconductor region S, which is the essential part that interacts with radiations. That is, when the thickness t of the semiconductor region S is reduced, the thickness of the electrode that does not interact with γ-rays, that is, the electrode (anode A and cathode C) that does not detect γ-rays, relatively increases on one hand, and the proportion of the semiconductor region S that interacts with γ-rays relatively decreases and the sensitivity of detecting γ-rays decreases as a result. Furthermore, when the thickness t is small, the capacitance per one detector element 211 increases. Since this capacitance corresponds to an input capacitance component viewed from the signal processing circuit (ASIC) in the following stage, noise is more likely to occur in the signal processing circuit as the input capacitance increases and it is more likely to deteriorate energy resolution and coincidence resolution. Furthermore, securing the detection sensitivity per one detector 21 to a certain degree requires the volume of the detector 21 to be increased to a certain degree. For this purpose, the detector elements 211 are arranged in parallel to effectively secure the volume of the detector 21 as will be described later, but as the thickness t decreases, the number of elements to be arranged in parallel must be increased. As a result, the capacitance per one detector increases synergistically, causing deterioration in performance of the PET imaging apparatus 1 (deterioration in PET image contrast due to the deterioration in energy resolution, increase in the inspection time due to the deterioration of coincidence resolution or deterioration in image quality, etc.).

The conductive members 22, 23 are flat plates of copper (or material whose principal ingredient is copper, for example, phosphor bronze) and have the same size as that of the respective electrodes of the detector element 211. The thickness of the conductive members 22, 23 is approximately 10 μm to 100 μm and preferably approximately 50 μm. The conductive member 22 includes a projection 22a (second electrical connection section) which protrudes outward from the semiconductor region S. The conductive member 23 includes a projection 23a (first electrical connection section) which protrudes outward from the semiconductor region S. More specifically, the projection 22a of the conductive member 22 connected to the cathode C is located on one side (left side in FIG. 3B) of the detector 21. The projection 23a of the conductive member 23 connected to the anode A is located on the other side facing the one side (right side in FIG. 3B) of the detector 21. The detector 21 is fixed to the wiring board 24 electrically connected thereto with three projections 22a and two projections 23a (see FIG. 3C). Thus, the conductive members 22, 23 also serve as fixing members to fix the detector 21 to the wiring board 24. Especially, the projections (electrical connection sections) 22a, 23a serve as the fixing sections to attach the detector 21 to the wiring board 24. Each detector 21 is disposed in such a way that the detector element 211 and the wiring board 24 cross each other, or more specifically cross each other at right angles, and is attached to the wiring board 24. The material of the conductive members 22, 23 is not limited to copper, but can also be aluminum or aluminum alloy and the shape thereof need not always be tabular. Furthermore, the size of the conductive members 22, 23 is preferably the same as the size of the electrodes of the detector element 211, but the size need not always be completely the same.

In the detector 21, each of the semiconductor regions S arranged in parallel has the aforementioned thickness t (0.2 to 2 mm). The thickness of the cathode C and anode A is approximately several μm at most. Since the cathodes C and anodes A of the plurality of detector elements 211 are connected together respectively, the detector 21 is not structured so as to identify the semiconductor region S of which detector element 211 interacts with γ-rays. Such a structure of the detector 21 is intended to reduce the thickness t of the semiconductor region S (see FIG. 3A), increase the charge collection efficiency, increase the rising speed of peak values, increase energy resolution, and at the same time the parallel arrangement of the semiconductor regions S is intended to reduce the amount of γ-rays that pass through and increase interaction between the semiconductor regions S and γ-rays (increase a γ-ray count). The increase in the γ-ray count leads to improve the sensitivity of the detector 21. Of course, it is also possible to adopt a structure that allows radiation to be identified for each detector element 211.

Figure 3C:
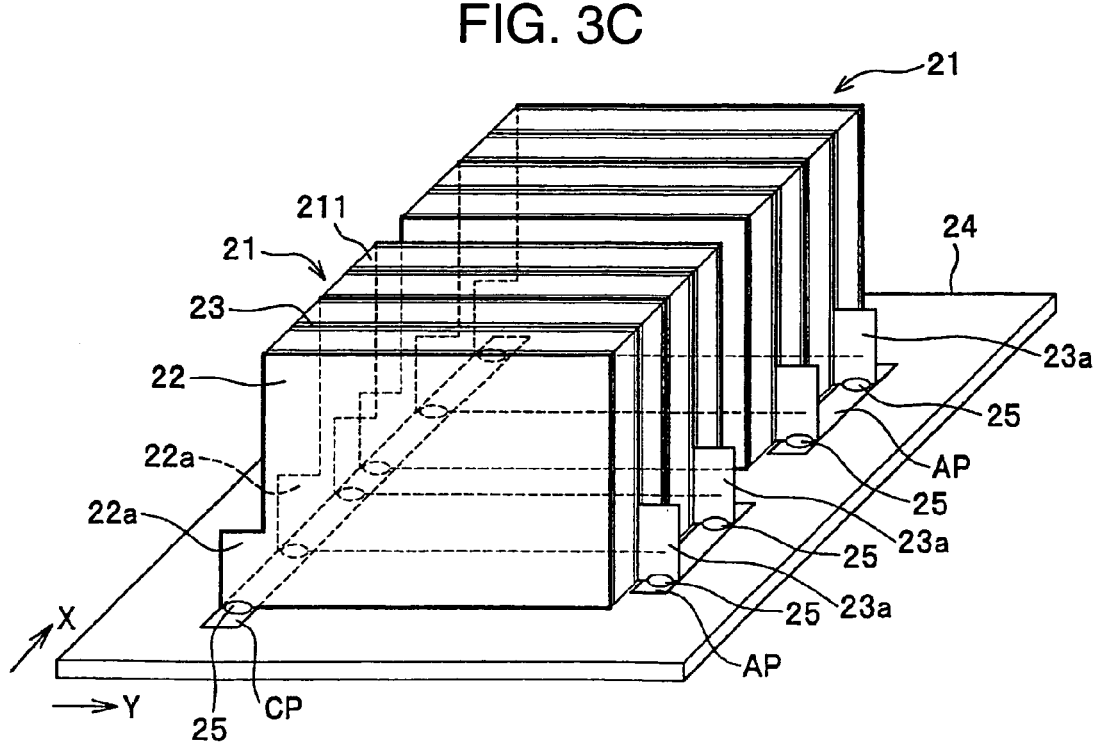

As shown in FIG. 3C, the detector 21 is disposed on the wiring board 24 with a cathode connection member (e.g., printed wiring board pad) CP (second connection member) and an anode connection member AP (first connection member) provided on the surface of the wiring board 24 electrically connected to the projections 22a and projections 23a respectively using a conductive adhesive 25. The projections 22a, 23a also serve as electrical connection sections to be connected to the connection members CP, AP which are the conductive members provided on the wiring board 24. As shown in FIG. 4, a plurality of connection members CP are disposed on the wiring board 24 as common connection members for a plurality of detectors 21. The four connection members CP (one connection member CP is not shown) are arranged in parallel in the Y direction (from left to right in FIG. 4A) of the wiring board 24. All the connection members CP are short-circuited by wiring 24a which is buried in the wiring board 24 and given the same potential. The wiring 24a is connected to a terminal 33 provided at one end of the wiring board 24.

As the connection members for each detector 21, the connection members AP are arranged in two rows between two neighboring connection members CP and disposed on the wiring board 24. A signal line (wiring) 24b buried in the wiring board 24 is connected to each connection member AP. This allows a γ-ray detection signal of each detector 21 to be output through the corresponding signal line 24b. The respective signal lines 24b are individually connected to a plurality of terminals 34 provided at one end of the wiring board 24.

In this embodiment, a series of detectors 21 (six detectors 21) arranged in the Y direction are disposed in such a way that between the two adjacent neighboring detectors 21, the projections 23a, 23a of the respective conductive members 23 (connected to anodes A) face each other as shown in FIG. 4A. In such a condition, as shown in FIG. 3C, the projections 23a of the respective detectors 21 are attached to the corresponding connection members AP using the adhesive 25. Furthermore, the projections 22a of the respective detectors 21 are attached to the connection members CP using the adhesive 25. In the two detectors 21 disposed on both sides of a connection member CP1 which is located in the center among the four connection members CP, the projections 23a of the respective conductive members 22 (connected to cathodes C) face each other. This allows the connection member CP1 to be shared by the detectors 21 (neighboring in the Y direction) disposed on both sides of the connection member CP1.

As the adhesive 25, conductive paste and solder, etc., can be used. Considering the convenience in the case of removing a faulty detector 21 due to malfunction, etc., from the wiring board 24, it is preferable to use a thermoplastic adhesive for the adhesive 25. On the other hand, for bonding between the detector element 211 and conductive members 22, 23, it is preferable to use a thermosetting adhesive which has the nature opposite to that of the thermoplastic adhesive so that these components are not separated. Selecting two different adhesives is useful because in the former, the part to which the adhesive 25 is applied is softened by overheat allowing the detector 21 to be removed easily, while in the latter, the detector element 211 and conductive members 22, 23 are hardly separated even if the detector element 211 is heated by a heat transfer.

Here, an overview of the principles of detection of γ-rays by the detector 21 will be explained. When γ-rays enter the detector 21 from the Y direction and γ-rays interact with the semiconductor regions S, pairs of holes and electrons are produced in quantities proportional to the energy of γ-rays. Here, a bias voltage for charge collection (e.g., a backward applied voltage such that the cathode C has −500 V and anode A has a potential close to ground potential, that is, the anode A has a potential 500 V higher than the potential of the cathode C) is applied between the cathode C and anode A of the detector 21 from a DC voltage power supply (not shown). For this reason, holes corresponding to positive charge are attracted and moved to the cathode C, while electrons having negative charge are attracted and moved to the anode A. When these holes and electrons are compared, electrons have relatively greater mobility, and therefore electrons reach the anode A in a shorter time. On the other hand, holes have relatively smaller mobility, and therefore holes reach the cathode C in a relatively longer time. Holes may also be trapped before they reach the electrode.

The conductive members 23 disposed between the anodes A, and the conductive members 22 disposed between the cathodes C constitute insensible regions where no γ-rays are detected. Therefore, the detector 21 constructed in such a way that the conductive members 23, 22 constituting the insensible regions are disposed between the detector elements 211, or more specifically, between the electrodes. Both the anodes A and cathodes C are insensible regions.

As shown in FIGS. 2A, 2B, the detectors 21 are arranged on the wiring board 24 of the detection module 20A, six channels in the Y direction (radius direction of the PET imaging apparatus 1) from the detection module 20A to the ASIC substrate 20B, 16 channels in the X direction (circumferential direction of the PET imaging apparatus 1) orthogonal to the Y direction and two channels (both sides of the wiring board 24) in the Z direction (depth direction of the PET imaging apparatus 1) which is the thickness direction of the wiring board 24. In this way, a total of 96 channels of the detectors 21 are arranged on one side of the wiring board 24, a total of 192 channels on both sides.

As the arrangement density of the detectors 21 arranged on the detection module 20A increases, it becomes easier to detect γ-rays and it is possible to increase the positional accuracy when detecting γ-rays. The detection module 20A according to this embodiment can improve the arrangement density of the detectors 21 using the three structures as will be explained below. In a first structure, the respective detectors 21 are arranged in such a way that the projections 22a, 22b are oriented in the Y direction. This prevents the respective projections from being oriented in the X direction, and therefore it is possible to narrow gaps between the detectors 21 in the X direction. In a second structure, the respective detectors 21 are arranged in such a way that electrodes of the same polarity (e.g., cathode C) face each other in the X direction. This arrangement reduces insulation between the detectors 21 in the X direction, and can thereby narrow gaps between the detectors 21 in the X direction. Furthermore, in a third structure, the neighboring detectors 21 in the Y direction are arranged in such a way that the projections (parts of electrical connections with the outside of the detector) connected to the electrodes of the same polarity (anode A or cathode C) are arranged so as to face each other. This arrangement reduces insulation between the detectors 21 in the Y direction, and can thereby narrow gaps between the detectors 21 in the Y direction.

According to the first and second structures, the gaps between the detectors 21 in the X direction are narrow, and therefore when γ-rays emitted from within the body of the examinee H on the bed 31 travel from bottom to top in FIG. 2A (Y direction, that is, radius direction of the PET imaging apparatus 1 (see FIGS. 1A, 1B), it is possible to reduce the proportion of γ-rays passing without being detected by the detectors 21 (γ-rays passing through gaps formed between the neighboring detectors 21). Therefore, the first and second structures increase the detection efficiency of γ-rays and also improve spatial resolution of an image obtained. There is also an advantage of shortening an examination time. Furthermore, according to the third structure, the gaps between the detectors 21 in the Y direction are narrow, and therefore the proportion of γ-rays in the Y direction traveling askew with respect to the wiring board 24 that pass through the gaps between the detectors 21 in the Y direction is reduced. Therefore, this third structure as well as the first and second structures can increase the detection efficiency of γ-rays and improve the spatial resolution of an image obtained. It also contributes to a reduction of the examination time.

Thus, the detection module 20A having the first, second or third structure can increase the detection efficiency of γ-rays and improve the spatial resolution of images.

Since this embodiment arranges the detectors 21 on both sides of the wiring board 24, it is possible to reduce the number of wiring boards 24 arranged in the depth direction (Z direction) of the PET imaging apparatus 1 to half that in the case where the detectors 21 are only arranged on one side. This makes it possible to arrange the detectors 21 in the Z direction more densely. This embodiment also contributes to an increase in detection efficiency of γ-rays and an improvement of spatial resolution of images in this case, too. It is also possible to further reduce the examination time. In addition, since the number of wiring boards 24 (unit substrates U) can be reduced by half as shown above, there is also a merit that it saves time and trouble in mounting the unit substrates U on the PET imaging apparatus 1 (see FIG. 1A, 1B).

The detectors 21 are preferably coated with insulators to avoid dielectric breakdown. The insulator coats can be formed by immersing the unit including the entire detection module 20A in an insulator such as silicon rubber and then drying it to a thickness of several tens of microns. In this case, the detectors 21 excluding the projections 22a, 23a may be coated with the insulator first and then those projections 22a, 23a may be attached to the corresponding connection members of the wiring board 24. In order to reduce the danger of dielectric breakdown between the conductive members 22, 23 and the connection members AP, CP of the corresponding electrodes, it is possible to make the conductive members 22, 23 smaller than the detector elements 211 so that portions of the projections 22a, 22b are disposed between the detector elements 211.

Furthermore, the detectors 21 may also be adapted so that the areas of contact of the detector element 211 with the wiring board 24 may also be fixed to the wiring board 24 using an insulating adhesive. Such a structure strengthens bonding, that is, holding power of the wiring board 24 to the detector 21. In this case, the insulating adhesive is preferably thermoplastic taking into account convertibility of the detectors 21.

Figure 5A:
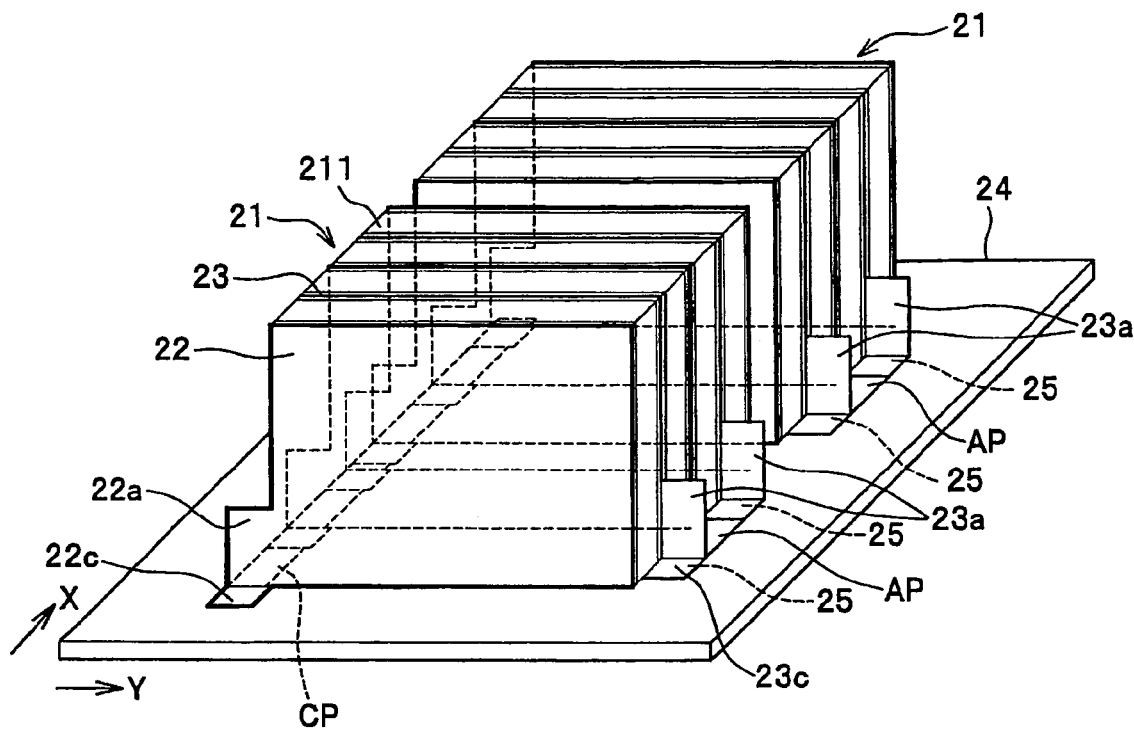
FIG. 5A is a perspective view of another embodiment of the radiation detector and FIG. 5B is a front view of a conductive member used for the radiation detector shown in FIG. 5A.
Figure 5B:
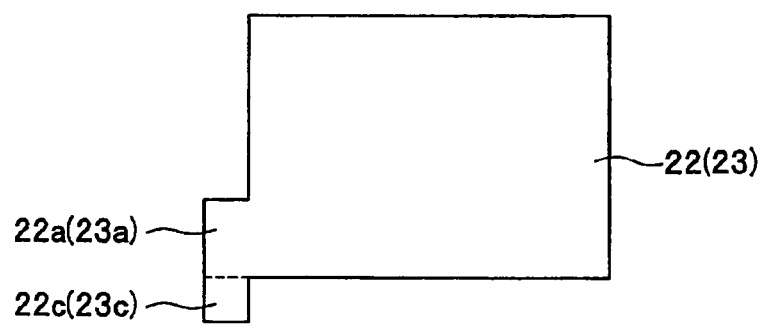

Furthermore, as shown in FIG. 5B, it is also possible to further extend lower parts of the projections 22a, 23a of the conductive members 22, 23 downward to provide folded parts 22c, 23c and connect the folded parts 22c of the conductive members 22 to the connection member CP and connect the folded parts 23c of the conductive members 23 to the connection member AP as shown in FIG. 5A. It is possible to connect the folded parts 22c to the connection member CP and connect the folded parts 23c to the connection member AP using the adhesive 25. In this case, since contacts of the folded parts 22c, 23c with the connection member CP and connection member AP are surface-to-surface contacts, it is possible to fix the detectors 21 to the wiring board 24 more firmly.

Figure 6:
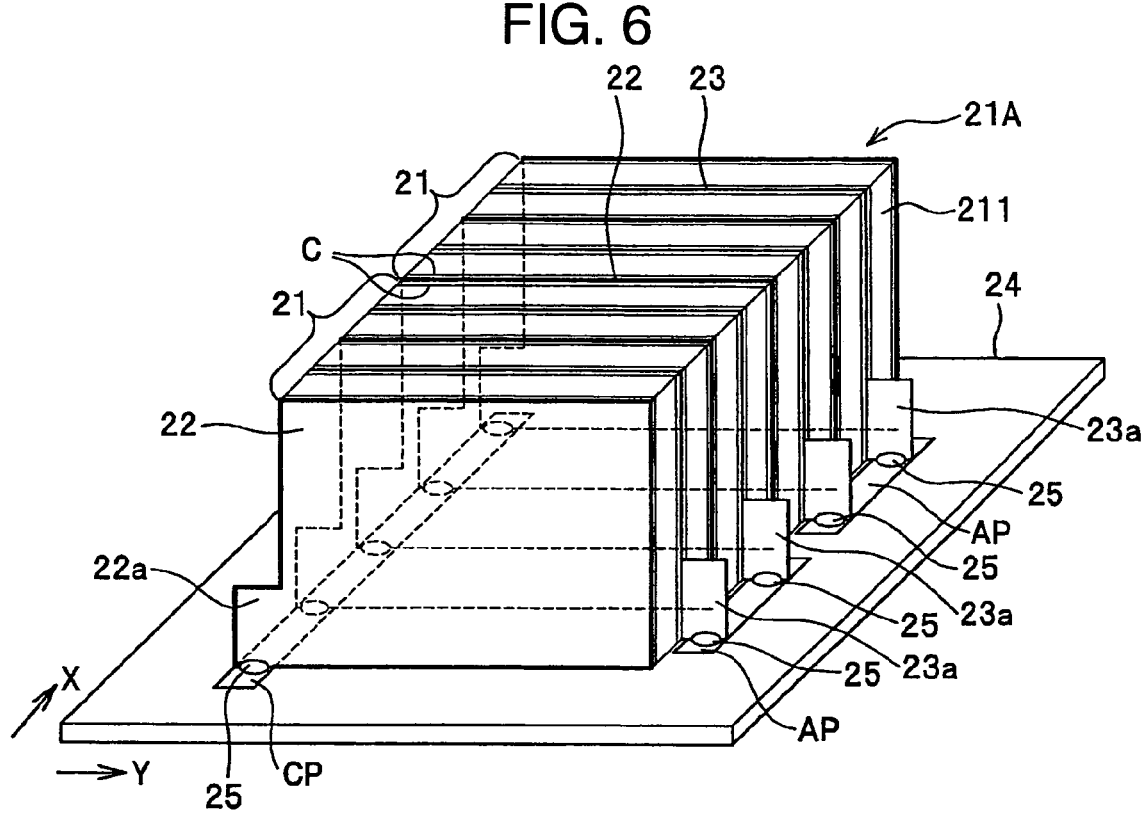
FIG. 6 is a perspective view of another embodiment of the radiation detector.

Furthermore, as shown in FIG. 6, it is also possible to share one conductive member 22 by cathodes C of the neighboring detectors 21 so as to integrate a plurality of detectors 21 into a one greater detector 21A. This structure can reduce the number of neighboring conductive members 22 of the neighboring detectors 21 by one for each pair in the X direction in FIG. 2A, increasing the number of detectors 21 in the X direction. Therefore, it is possible to realize high-density mounting of detectors 21 on the wiring board 24. Such mounting is feasible when there are an even number of detector elements 211 making up one detector 21 and the electrode disposed at one end at which the detectors 21 face each other is the cathode C.

(Unit Substrate)

A detailed structure of the unit substrate U will be explained using FIGS. 2A, 2B. The unit substrate U is provided with the detection module 20A on which a plurality of detectors 21 are arranged as described above and an ASIC substrate 20B. The ASIC substrate 20B includes capacitors 26, resistors 27, analog ASICs 28 and a digital ASIC 29.

(Detection Module)

As shown in FIG. 4, the detection module 20A is constructed of a plurality of detectors 21 arranged on the wiring board 24. A voltage of, for example, 500 V is applied between the anode A and cathode C of the detector 21 for charge collection as described above. This voltage is applied between the anode A and cathode C of the respective detectors 21 from power supply wiring (not shown) set on the ASIC substrate 20B via a connector C1 and power supply wiring (not shown) set on the wiring board 24 of the detection module 20A. The detection module 20A is provided with the connector C1 at one end of the wiring board 24. The connector C1 includes the aforementioned terminal 33 and a plurality of terminal 34. γ-ray detection signals output from the respective detectors 21 are supplied to the ASIC substrate 20B via the connector C1.

(ASIC Substrate)

As shown in FIGS. 2A, 2B, the ASIC substrate 20B arranges four analog ASICs 28 and one digital ASIC 29 on one side of a wiring board (support substrate) 35. As shown in FIG. 2B, since the analog ASICs 28 are disposed on both sides of the wiring board 35, one ASIC substrate 20B includes a total of eight analog ASICs 28. As many capacitors 26 and resistors 27 as the detectors 21 are arranged on both sides of the wiring board 35. Furthermore, there are a plurality of connection wires (not shown) inside the wiring board 35 for electrically connecting these capacitors 26, resistors 27, analog ASICs 28 and digital ASIC 29. These connection wires have a layered structure inside the wiring board 35. The arrangement of the capacitors 26, analog ASICs 28 and digital ASIC 29 on the wiring board 35 agrees with the order in which signals are supplied from the detectors 21 of the detection module 20A. One end of the resistor 27 is connected to the input side of the capacitor 26 and the other end is connected to ground wiring (not shown) provided on the wiring board 35. The analog ASIC 28 is an application-specific IC which processes analog signals (γ-ray detection signals) output from the detectors 21 and is a kind of an LSI. The analog ASIC 28 is provided with a signal processing circuit for each detector 21. These signal processing circuits are designed to receive a γ-ray detection signal (radiation detection signal) output from the corresponding one detector 21 and calculate a γ-ray peak value.

The ASIC substrate 20B is provided with a connector (e.g., spring pin connector) C2 having a plurality of terminals connected to the respective capacitors 26 at one end of the wiring board 35.

The unit substrates U are arranged on a ring-shaped support member (not shown) provided on the PET imaging apparatus 1 in such a way that the surface on which the detectors 21 are arranged is oriented toward the depth direction (longitudinal direction of the bed 31 and Z direction in FIG. 2B) of the PET imaging apparatus 1. This ring-shaped support member is provided so as to surround the measuring space 32. The plurality of unit substrates U arranged on the ring-shaped member are disposed in the circumferential direction and surround the measuring space 32. The unit substrates U are arranged in such a way that the detection modules 20A are oriented inward (measuring space 32 side) and the ASIC substrates 20B are oriented outward. According to this embodiment, a plurality of unit substrates U are also arranged in the depth direction of the PET imaging apparatus 1. In the unit substrates U arranged as described above, the orientation of the X direction shown in FIG. 2A, FIG. 3C, etc., is the circumferential direction (circumferential direction of the ring-shaped support member) of the PET imaging apparatus 1 and the orientation of the Y direction shown in FIG. 2A, FIG. 3C, etc., is the radius direction (radius direction of the ring-shaped support member) of the PET imaging apparatus 1.

(Connection Structure Between Detection Module and ASIC Substrate)

As shown in FIG. 2B, the ends of the detection module 20A and ASIC substrate 20B overlap with each other and the connector C1 and connector C2 which exist in this overlapped area are connected. The ends of the detection module 20A and ASIC substrate 20B are connected in a freely detachable (freely separable and connectable) manner using screws, etc., for clamping the overlapped area. They are connected in the overlapped area for the following reasons. That is, the unit substrate U consisting of the combined detection module 20A and ASIC substrate 20B is supported on one side inside the PET imaging apparatus 1, and therefore forces of deflecting or bending the unit substrate U act on the central part (connection section) of the unit substrate U depending on the installation position thereof. The connection section having a structure with the end faces of the wiring board 24 and wiring board 35 butt-contacted is likely to deflect or bend, and is therefore undesirable.

On the basis of this point, this embodiment has the structure in which the detection module 20A and ASIC substrate 20B are connected in the overlapped area. Thus, the unit substrate U used in this embodiment improves toughness against deflection and bending compared to the connection of the wiring board 24 and wiring board 35, the ends of which are butt-contacted. Improving the toughness of the unit substrate U against deflection and bending suppresses, for example, dislocation of the detectors 21 and improves the accuracy of identifying positions at which γ-rays occur. As shown in FIG. 1A, many unit substrates U are arranged in the PET imaging apparatus 1 in the circumferential direction and depth direction, and therefore the unit substrates U located at the lower part (especially the bottom) in FIG. 1A are likely to deflect or bend. For this reason, the toughness against deflection and bending of the unit substrates U constitutes an important factor.

Using such an electrical connection structure of the detection module 20A and ASIC substrate 20B using the connector C1 and connector C2 allows γ-ray detection signals to be transmitted from the detection module 20A to the ASIC substrate 20B with low losses. With reduced losses, the energy resolution of the detectors 21 improves, for example.

Since the detection module 20A is attached to the ASIC substrate 20B in a freely detachable manner using screws, etc., if problems like detection fault, etc., occurs in the detectors 21 and ASICs 28, 29, it is only necessary to replace parts with the problem (detection module 20A or ASIC substrate 20B). Moreover, since the detection module 20A and ASIC substrate 20B are electrically connected using the connector C1 such as the aforementioned spring pin connector, connection or disconnection (coupling or decoupling) between substrates is easy.

In the above-described structure, one detection module 20A is connected to the ASIC substrate 20B, but the detection module 20A may be divided into plurality of portions. For example, it is possible to connect two detection modules to the ASIC substrate, each substrate mounted with eight detectors 21 in the horizontal direction and six detectors 21 in the vertical direction. According to this structure, when one detector 21 malfunctions, it is only necessary to replace the one detection module mounted with the faulty detector out of the two detection modules, and thereby reduce waste (cost reduction) during maintenance. Instead of dividing the unit substrate U into the detection module 20A and ASIC substrate 20B, it is also possible to mount a plurality of detectors 21, capacitors 26, resistors 27 and analog ASICs 28 and one digital ASIC substrate on one wiring board. This structure eliminates the necessity for the connectors C1, C2.

The shorter the length of the circuit and wiring length (distance) of transmitting a γ-ray detection signal, the better, because there is less influence of noise and less attenuation of signals in midstream. Furthermore, when simultaneous measurement processing is performed using the PET imaging apparatus 1, a shorter circuit or shorter wiring is preferable because it results in a smaller time delay (preferable because the accuracy of the detection time is not reduced). For this reason, in this embodiment, the detectors 21, capacitors 26, analog ASICs 28 and digital ASIC 29 are arranged on the unit substrate U in that order from the central axis to the outside in the radius direction of the PET imaging apparatus 1. This structure makes it possible to shorten the length (distance) of wiring for transmitting feeble γ-ray detection signals output from the detectors 21 to amplifiers of the analog ASICs. This reduces influences of noise on the γ-ray detection signals and also reduces attenuation of the γ-ray detection signals.

Furthermore, it is also possible to arrange the capacitors 26 and resistors 27 inside the analog ASIC 28, but for reasons of obtaining appropriate capacitance and appropriate resistance values and reducing the size of the analog ASIC 28, the capacitors 26 and resistors 27 are disposed outside the analog ASIC 28 in this embodiment.

The capacitors 26, resistors 27 and analog ASICs 28 provided on the ASIC substrate 20B may also be provided on the detection module 20A instead of the ASIC substrate 20B. In this case, the capacitors 26, resistors 27 and analog ASICs 28 are arranged closer to the ASIC substrate 20B than the detectors 21. Since the detection module 20A includes the detectors 21 and analog ASICs 28, it is possible to further shorten the distance (length of wiring) between the detector 21 and analog ASIC 28. This further reduces influences of noise.

(Operation of PET Imaging Apparatus)

The operation of the PET imaging apparatus 1 structured as above will be explained. Before starting a radiation inspection, radiopharmaceuticals (e.g., containing $^{18}$F) for the PET are administered to the examinee H using a method such as an injection so that radioactivity in the body becomes approximately 370 MBq. Radiopharmaceuticals are selected according to the purpose of inspection (to locate cancers or inspect pulmonary aneurysm of heart, etc.). The radiopharmaceuticals administered are soon concentrated on the affected area of the examinee H. In this condition, the examinee H is laid on the bed 31.

The inspector who performs a PET inspection (clinical radiologic technologist or doctor) inputs necessary information (region whose tomogram is to be obtained (imaging region or region of concern), number of slices, slice interval, absorbed dose, etc.) through the data processing apparatus 2 (see FIG. 1A) according to the purpose of inspection. In this case, it is possible to display an information input screen (not shown) on the display apparatus 3 and input necessary data using a keyboard or mouse, etc. Then, the bed 31 is moved in the longitudinal direction to insert the examinee H into the measuring space 32 until the region to be inspected (e.g., affected area of cancer) of the examinee H up to a predetermined position. Then, the PET imaging apparatus 1 is activated.

According to an instruction from the data processing apparatus 2, a DC high voltage is applied between the anode A and cathode C of the detector 21 and the PET imaging apparatus 1 starts a PET inspection. γ-rays emitted from within the body of the examinee H provoked by radiopharmaceuticals are detected by the detectors 21. That is, a pair of γ-rays are emitted in diametrically opposite directions at the time of annihilation of positrons emitted from the PET radiopharmaceuticals and detected by different detectors 21. The detectors 21 output γ-ray detection signals. These detection signals are input to a signal processing circuit (not shown) inside the corresponding analog ASIC 28 via the signal lines 24b, connectors C1, C2 and capacitors 26. This signal processing circuit amplifies the γ-ray detection signals and finds peak values of the detected γ-rays. These peak values are converted to digital peak value information through an analog/digital converter (ADC) (not shown) in the digital ASIC 29. The digital ASIC 29 further outputs position information of the detectors 21 which have detected γ-rays and information on the γ-ray detection time. The digital peak value information, position information of the detectors 21 and information of the γ-ray detection time are input to the data processing apparatus 2. A simultaneous measurement apparatus (not shown) of the data processing apparatus 2 counts a pair of γ-rays generated by annihilation of one positron as one using the detection time information and identifies the positions of the detectors 21 which have detected the pair of γ-rays based on the position information thereof. Furthermore, a tomogram information creation apparatus (not shown) which is the image information creation apparatus of the data processing apparatus 2 creates the position of accumulation of radiopharmaceuticals, that is, tomogram information (image information) of the examinee at the malignant tumor position using the count value obtained by simultaneous measurement and position information of the detectors 21. This tomogram information is displayed on the display apparatus 3.

The effects produced in this embodiment will be explained below.

(1) This embodiment fixes the conductive members 22 interposed between the cathodes C of the neighboring detector elements 211 in parallel and connected to these cathodes C and the conductive members 23 interposed between the anodes A and connected to these anodes A, to the wiring board 24, and can thereby realize a high-density arrangement of the detectors 21. This embodiment can also improve spatial resolution.

Here, JP-A-7-122776 describes a radiation detection apparatus including a plurality of detector elements arranged in parallel and disposed vertically in a DIP package. Furthermore, the same publication (FIG. 13(b), FIG. 18(a)) describes a structure requiring bonding wires in which a conductive film tag interposed between detector elements is connected to electrode pins provided in the DIP package using the bonding wires. In contrast, this embodiment arranges conductive members 22, 23 intersecting the wiring board 24 at right angles, and can thereby use the conductive members 22, 23 as fixing members for fixing the detectors to the wiring board 24. Therefore, it is possible to fix the detectors 21 to the wiring board 24 without using any additional fixing member. Furthermore, as described in the aforementioned publication, this embodiment eliminates the necessity for any bonding wires. This embodiment can improve arrangement density of the detectors 21 on the wiring board 24 and improve the spatial resolution of images obtained. Furthermore, the improvement in arrangement density of the detector 21 also leads to an improvement in sensitivity of the detectors 21. This shortens the inspection time.

(2) Since the cathodes C or anodes A of the neighboring detector elements 211 are arranged so as to face each other, the conductive members 22, 23 can be shared. This eliminates the necessity to arrange electric insulators between the detector elements 211 and can realize high-density arrangement of the detector elements 211. This improves sensitivity and also shortens the inspection time.

(3) The conductive members 22, 23 have projections 22a, 23a which protrudes outward from the semiconductor region S and which are portions of the conductive members 22, 23 and the projections 22a, 23a are attached to the wiring board 24, and therefore the conductive members 22, 23 can be easily attached to the wiring board 24.

(4) Since the projections 22a, 23a are attached to the connection members CP, AP of the wiring board 24 using the adhesive 25, it is possible to shorten the time required to connect the connection members CP, AP to the projections 22a, 23a. That is, this embodiment can reduce the time required for connection work substantially by half compared to the case where they are connected using bonding wires as in the case of JP-A-7-122776. The adhesive 25 has both functions of electrical connection and mechanical connection (holding) between the detectors 21 and wiring board 24. Furthermore, since the connection of the projections 22a, 23a to the connection members CP, AP requires no other parts such as bonding wires, this embodiment can simplify the structure of the detection module 20A.

(5) Since a thermoplastic adhesive (or solder) is used as the adhesive 25 for attaching the conductive members 22, 23 to the wiring board 24 and a thermosetting adhesive is used for bonding between the detector element 211 and conductive members 22, 23, it is easy to remove the detectors 21 from the wiring board 24. For this reason, a faulty detector 21 can be easily replaced by a new detector 21. This is because when the detector 21 is removed, the applied adhesive 25 is softened by heat. Moreover, even if the detector element 211 is heated, the detector elements 211 will not be separated from the conductive members 22, 23, and therefore the detector elements 211 of the faulty detector 21 will not fall apart and can be removed from the wiring board 24 as one body. In this way, it is possible to shorten the time required to remove the detector 21.

(6) Since the conductive members 22, 23 are attached so as to substantially cover the surfaces of the electrodes of the cathode C and anode A, the electric resistance of the bonding area between the conductive member 22 and cathode C and the electric resistance of the bonding area between the conductive member 23 and anode A are reduced, and it is possible to increase the voltage of a γ-ray detection signal output from the detector 21. Furthermore, the conductive members 22, 23 are made of conductive metal which is a conductive member having rigidity, and therefore they function as protective members of the semiconductor region S as well. Especially, when the semiconductor region S is made of a semiconductor material such as CdTe, CZT, GaAs which is mechanically brittle, the conductive members 22, 23 can prevent damages to the semiconductor region S.

(7) Since copper sheets are used as the conductive members 22, 23, it is possible to extract signals stably and obtain detectors 21 with attaching rigidity.

(8) Since the projections 22a, 23a protrude from two different sides of the detector 21, it is possible to increase electrical insulating properties of the detection module 20A.

(9) Since the detectors 21 are arranged in such a way that the projections 22a, 22b are oriented toward the Y direction, it is possible to narrow gaps between the detectors 21 in the X direction and reduce the proportion of γ-rays that pass through the gaps. This increases detection efficiency of γ-rays and can improve the spatial resolution of images obtained.

(10) Since the detectors 21 are arranged in the X direction so that the electrodes of the same polarity face each other, it is possible to reduce insulation between the detectors 21 in the X direction and narrow gaps between the detectors 21 in the X direction. As in the case of (9) above, this also improves the detection efficiency of γ-rays and improve spatial resolution of images.

(11) Since the neighboring detectors 21 are arranged in the Y direction so that the projections connected to the electrodes of the same polarity (anode A or cathode C) face each other, it is possible to reduce insulation between the detectors 21 in the Y direction and narrow gaps between the detectors 21 in the Y direction. Therefore, it is possible to improve the detection efficiency of γ-rays and improve spatial resolution of images. The positions at which the projections face each other also include not only a case where the projections of the mutually facing detectors 21 completely face each other but also a case where the mutually facing detectors 21 shift in the X direction which interests the Y direction at right angles and the positions of both projections shift in the X direction. More specifically, a state in which the sides of the neighboring detectors 21 from which the projections 23*a* protrude in the Y direction face each other is the state in which the projections are arranged so as to face each other.

(12) Since the detectors 21 are arranged on both sides of the wiring board 24, it is possible to reduce the number of wiring boards 24 in the PET imaging apparatus 1 by half and improve the arrangement density of the detectors 21 in the PET imaging apparatus 1. Thus, it is possible to further improve detection efficiency of γ-rays and spatial resolution of images of the PET imaging apparatus 1.

(13) Since the detection module 20A and ASIC substrate 20B are attached in a freely detachable manner, when either one malfunctions, it is possible to easily replace the faulty detection module 20A or ASIC substrate 20B.

(14) Since the PET imaging apparatus 1 using the detectors 21 forms a signal processing circuit using ASICs, etc., which incorporate many amplification circuits individually corresponding to the respective detectors 21, it is possible to reduce the size of the detectors 21 or by extension respond to an increase in the number of detectors 21. As a result, it is possible to further improve spatial resolution.

(15) Since it is possible to construct the detection module 20A capable of installing many detectors 21 having high energy resolution, it is possible to realize highly quantitative inspections during 3D imaging.

(16) By covering the detectors 21 mounted on the wiring board 24 with an electric insulator, it is possible to prevent dielectric breakdown of the detectors 21.

(17) Since the connection members AP in the Y direction are arranged in two parallel rows between the connection members CP, it is possible to connect the respective projections 23*a* connected to the electrodes (anodes A) of the same type of the neighboring detectors 21 in the Y direction to the respective connection members AP arranged in the two rows. Therefore, it is possible to reduce mutual electrical insulation between the detectors 21 in the Y direction and narrow the distance between the detectors 21 in the Y direction. This can also improve arrangement density of the detectors 21 on the wiring board 24 and improve detection efficiency of γ-rays and spatial resolution of images obtained.

(18) Since the projections 22*a* of the two neighboring detectors 21 in the Y direction are connected to the connection member CP (e.g., connection member CP1), it is possible to improve arrangement density of the detectors 21 in the Y direction. In this way, it is also possible to improve the detection efficiency of γ-rays and spatial resolution of images. Furthermore, this structure can shorten the length of the wiring board 24 in the Y direction and shorten the length of the PET imaging apparatus 1 in the radius direction. This leads to a reduction in size of the PET imaging apparatus 1. The arrangement of the detectors 21 shown in (11) above can also reduce the length of the wiring board 24 in the Y direction. In this way, it is possible to shorten the length of the PET imaging apparatus 1 in the radius direction and make the PET imaging apparatus 1 more compact.

(19) Since the wiring 24*a* connected to the connection members CP and shared by the plurality of connection members CP is provided on the wiring board 24, it is possible to reduce the wiring density of the wiring 24*a*, 24*b* provided on the wiring board 24. Therefore, it is possible to facilitate wiring on the wiring board 24.

(20) Since the surface of the wiring board 24 to which the detectors 21 are attached are disposed in the longitudinal direction of the bed 31, it is possible to arrange the detectors 21 densely in the radius direction (X direction) of the PET imaging apparatus 1. This allows the detection efficiency of γ-rays and spatial resolution of images to be improved.

Embodiment 2

A PET imaging apparatus which is another embodiment of the present invention will be explained. The PET imaging apparatus of this embodiment has a structure with the detectors 21 used for the PET imaging apparatus 1 shown in FIG. 1A, 1B replaced by detectors 21B shown in FIGS. 7A, 7B. The structure of the PET imaging apparatus of this embodiment other than the detectors is the same as that of the PET imaging apparatus 1 shown in FIG. 1 which is the foregoing embodiment.

Figure 7A:
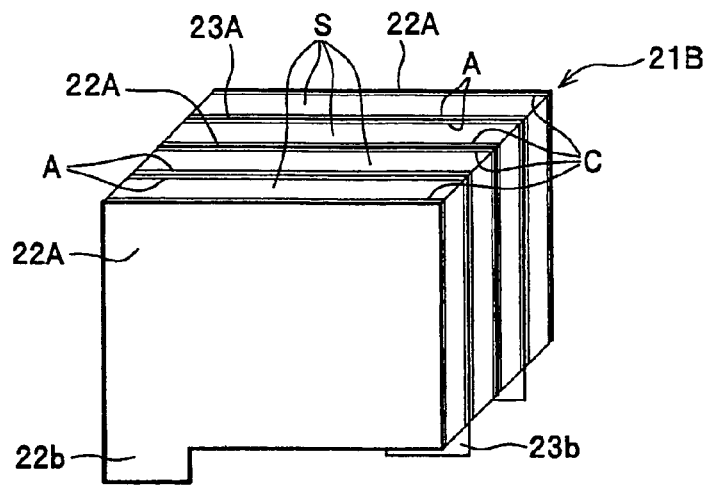
FIG. 7A is a perspective view of a radiation detector used for Embodiment 2, FIG. 7B schematically shows this radiation detector placed on a wiring board

The detector 21B used in this embodiment will be explained using FIG. 7A. Like the detectors 21, the detectors 21B each consist of an even number of detector elements 211 arranged in parallel with mutually facing anodes A and mutually facing cathodes C. A conductive member 23A is interposed between the anodes A of the neighboring detector elements 211 and a conductive member 22A is interposed between the cathodes C of the neighboring detector elements 211. The conductive member 23A is attached to the anodes A of the neighboring detector elements 211 using a conductive adhesive. The conductive member 22A is attached to the cathodes C of the neighboring detector elements 211 using a conductive adhesive. The conductive member 22A is also attached to the cathodes C provided for the respective detector elements 211 at both ends of the detector 21B using a conductive adhesive.

The conductive members 22A and 23A form projections 22*b*, 23*b* which protrude from the same side (plane facing the wiring board 24) toward the same direction. The projections 22*b*, 23*b* protrude outward from the semiconductor region S, that is, downward from the bottom (surface facing the wiring board 24) of the detector 21B. The projection 22*b* is located on one side of the detector element 211 and the projection 23*b* is located on the other side of the detector element 211 facing the one side.

Figure 7B:
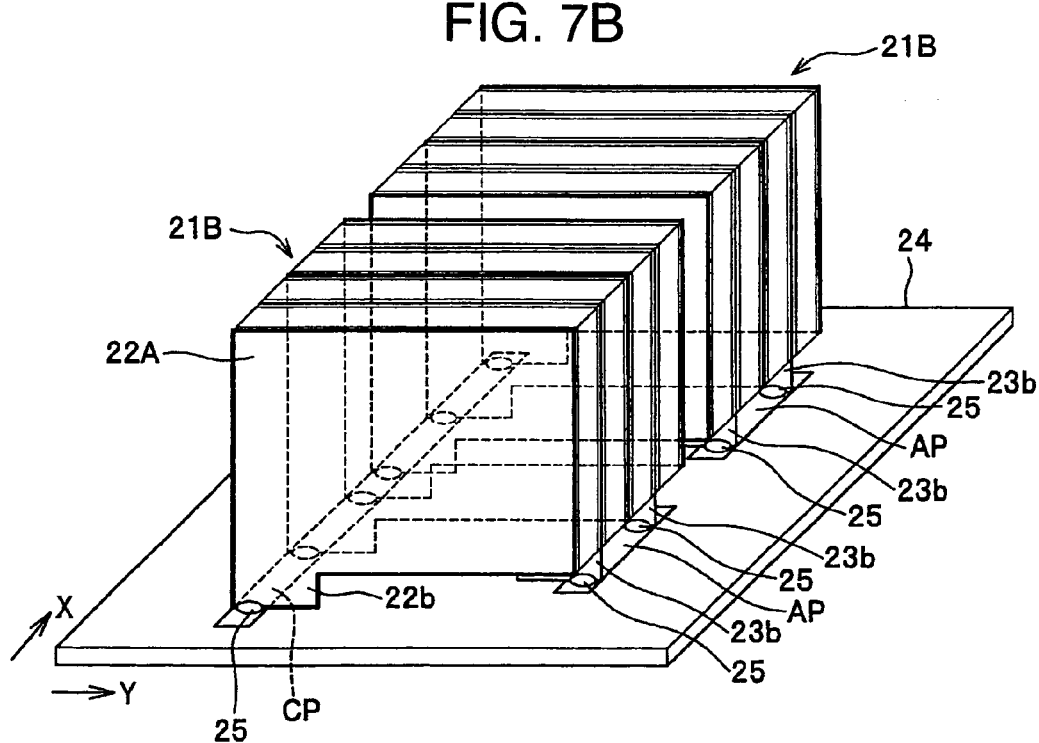
FIG. 7C is a front view of another embodiment of a conductive member used for the radiation detector shown in FIG. 7A.

As shown in FIG. 7B, the respective projections 22*b* of the detector 21B are placed on the connection member CP and attached to the connection member CP using the adhesive 25. Furthermore, the respective projections 23*b* of the detector 21B are placed on the connection member AP and attached to the connection member AP using the adhesive 25. In this way, the detector 21B is attached to the wiring board 24. The respective semiconductor regions S of the detector 21B are arranged so as to cross the wiring board 24, or more specifically so as to cross at right angles. This embodiment also arranges a plurality of detectors 21B on the wiring board 24 as shown in FIG. 4A to form a detection module.

This embodiment can produce the effects (1) to (7) and (9) to (20) of Embodiment 1 above. This embodiment further produces the following effects:

(21) In this embodiment, the projections 22*b*, 23*b* for connecting and fixing the detectors with the wiring board 24 protrude downward from the detector 21 and the conductive members 22, 23 do not protrude on both facing sides of the detector 21. This further reduces the distance between the neighboring detectors 21 in the Y direction and can improve the arrangement density of the detectors 21 on the wiring board 24. This embodiment can improve detection efficiency of γ-rays and improve spatial resolution of images.

(22) The projection 23b of the conductive member 23 connected to the anode A and the projection 22b of the conductive member 22 connected to the cathode C protrude at different positions on one surface of the semiconductor region S on which neither the anode A nor cathode C is provided, that is, the surface facing the wiring board 24, and therefore it is possible to easily connect the projection 23b to the conductive member 23 and connect the projection 22b to the conductive member 22.

(23) As described above, it is possible to shorten the distance between the detectors 21 in the Y direction (radius direction of PET imaging apparatus 1), and therefore the distance between the examinee H and the detector 21 on the next stage in the Y direction is shortened. This has the effect of improving the γ-ray detection sensitivity of the PET imaging apparatus 1.

The arrangement in Embodiment 2 in which the projections face each other refers to a state in which of the two sides of the neighboring detectors 21B in the Y direction crossing the surface of the detector 21B from which projection 22b protrudes at right angles, the sides on the projection 22b side face each other.

Figure 7C:
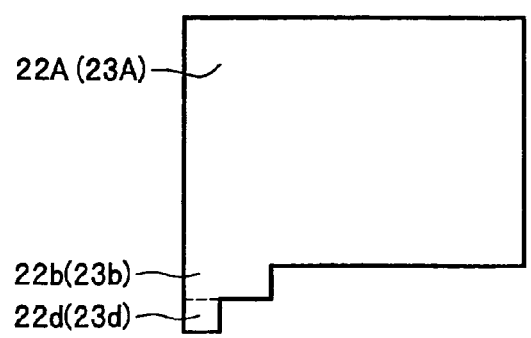

As shown in FIG. 7C, it is also possible to further extend the lower parts of the projections 22b, 23b of the conductive members 22A, 23A downward and form a folded parts 22d in the projection 22b and form a folded parts 23d in the projection 23b. In this case, the folded parts 22d is connected to the connection member CP and the folded parts 23d is connected to the connection member AP using the adhesive 25. Such connections of the folded parts 22d, 23d can realize enhanced fixing of the detectors 21 to the wiring board 24. Furthermore, it is also possible to provide a concave section (groove) (not shown) whereby the projections 22b, 23b are fitted into the wiring board 24, fit the projections 22b, 23b into the concave section and fix the detector 21B to the wiring board 24.

In the aforementioned Embodiments 1 and 2, one connection member AP per one detector 21 (or 21B) is provided on the wiring board 24. However, it is also possible to provide a different connection member AP to the wiring board 24 for each projection 23a (or 23b) of the detector 21 (or 21B). In this case, the respective projections 23a (or 23b) of one detector 21 (or 21B) are connected to different connection members AP using the adhesive 25. These connection members AP are connected to one signal line 24b inside the wiring board 24. Adopting such a structure can reduce the area of the connection members AP on the surface of the wiring board 24 (e.g., make the area equal to the cross-sectional area of the projection 23a (or 23b)) and can thereby prevent dielectric breakdown between the cathode C and conductive member 22 (or 22A) and connection member AP. Such a structure of the connection member AP is also applicable to the connection member CP. That is, as many different connection members CP as projections 22a (or 22b) of the respective detectors 21 (or 21B) connected to one connection member CP shown in FIG. 4A are arranged on one row on the wiring board 24. Then, the projections 22a (or 22b) corresponding to these connection members CP are connected separately using the adhesive 25. These connection members CP are connected to one wiring 24a inside the wiring board 24. However, the connection member CP which connects the mutually facing projections 22a (or 22b) of the neighboring detectors 21 (or 21B) is disposed on the wiring board 24 one by one between the mutually facing projections 22a (or 22b). Furthermore, the area of the connection member CP on the surface of the wiring board 24 can also be reduced in the same way as the above-described connection member AP, and therefore it is possible to prevent dielectric breakdown between the anode A and conductive member 23 (or 23A) and connection member CP.

In the above-described structure, the connection member AP is provided for each projection 23a (or 23b) of the detector 21 (or 21B) and the connection member AP is provided for each projection 22a (or 22b) of the detector 21 (or 21B) on the wiring board 24. This structure is also applicable to the respective detection modules provided with detectors having the folded parts 22c, 23c shown in FIG. 5B and detectors having the folded parts 22d, 23d shown in FIG. 7C. In this case, it is preferably to determine the sizes of the folded parts 22c, 23c, 22d, 23d to sizes enough to hold the detectors 21.

In Embodiments 1 and 2, the projections 23a (or 23b) of the conductive members 23 (or 23A) connected to the anode A are connected to the connection member AP and the projection 22a (or 22b) of the conductive members 22 (or 22A) connected to the cathode C are connected to the connection member CP, but it is also possible to connect the projections 23a (or 23b) to the connection member CP and connect the projections 22a (or 22b) to the connection member AP. In this case, the cathode C becomes the electrode for outputting γ-ray detection signals and the anode A becomes the electrode for applying a bias voltage. Any pattern can be realized if the voltage applied between the anode A and cathode C is at least a backward voltage.

In Embodiments 1 and 2, the potential of the anode A is set to substantially ground potential and the potential of the cathode C is set to −500 V, but there is no restriction on the potential if it is at least a backward one and it is possible to set a voltage value within a range in which the PET imaging apparatus functions. It is also possible to use the cathode C as the electrode for extracting radiation detection signals and use the anode A as the electrode for applying a bias voltage.

Embodiments 1 and 2 arrange the cathodes C at both ends of the detector 21 (or 21B). However, it is also possible to arrange four detector elements 211 so that the anodes A are disposed at both ends of the detector 21 (or 21B). In this way, the cathodes C face each other at two locations and the anodes A face each other at one location in the detector.

In Embodiments 1 and 2, four detector elements 211 are arranged in parallel to form a detector 21, but the number of elements arranged in parallel is not limited to four. However, to improve electrical insulating properties in the X direction, it is preferable to construct one detector with an even number of detector-elements 211.

In Embodiments 1 and 2, as shown in FIG. 3C, FIG. 4A, FIG. 5A, FIG. 6 and FIG. 7B, the connection members AP and connection members CP on the wiring board 24 are also provided at locations other than areas where the adhesive 25 is connected. The area of these connection member AP and connection member CP can be limited to a minimum necessary area to which the adhesive 25 is connected and can be connected within the wiring board 24 if necessary. This makes it possible to enhance electrical insulating properties between the connection member AP, connection member CP and corresponding electrodes on the surface of the wiring board 24.

The foregoing embodiments have explained the PET imaging apparatus (see FIG. 1) as an example of radiological imaging apparatus, but the detector and detection module of the present invention are not limited to the PET imaging apparatus and can be applied to a SPECT (Single Photon Emission Computer Tomography) apparatus and γ-camera. It is a point common to the PET imaging apparatus and SPECT apparatus that a three-dimensional functional image of an examinee is taken, but the SPECT apparatus is based on a principle of measurement for detecting single photons, and therefore it cannot perform simultaneous measurement and is provided with a collimator for regulating the position of incidence (angle) of γ-rays. Furthermore, a functional image obtained by a γ-camera is two-dimensional and it is provided with a collimator for regulating the position of incidence (angle) of γ-rays.

It is also possible to construct a radiological imaging apparatus combining a PET imaging apparatus or SPECT apparatus with an X-ray CT.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radiation detection module comprising at least one radiation detector and a support substrate to which said radiation detector is attached,
   wherein said radiation detector comprises a plurality of radiation detector elements including a semiconductor region, a first electrode which collects a radiation detection signal and a second electrode which applies a bias voltage, both of which face each other with said semiconductor region interposed in between, said semiconductor region being disposed so as to cross said support substrate, and a plurality of conductive members,
   said plurality of radiation detector elements are arranged with said electrodes of the same type arranged in parallel facing each other, some of said plurality of conductive members are arranged between said electrodes of the same type facing each other and attached to these electrodes and the rest of said conductive members are attached to said first electrode or said second electrode which is singly disposed, and
   said conductive members are attached to said support substrate and connected to wiring provided for said support substrate.

2. The radiation detection module according to claim 1, wherein said conductive members are fixing members for fixing said radiation detectors to said support substrate.

3. The radiation detection module according to claim 1, wherein some of said conductive members are attached to said first electrode and other said conductive members are attached to said second electrode through a conductive adhesive.

4. The radiation detection module according to claim 3, wherein said conductive adhesive is a thermosetting adhesive.

5. The radiation detection module according to claim 1, wherein each of said conductive members includes an electrical connection section which protrudes outward from said semiconductor region and which forms part of said conductive member, and the structure of attaching said conductive member to said support substrate is realized by attaching said electrical connection section to said support substrate.

6. The radiation detection module according to claim 5, wherein the position at which said electrical connection section protrudes differs between said conductive member connected to said first electrode and said other conductive member connected to said second electrode.

7. The radiation detection module according to claim 6, wherein said electrical connection section of said conductive member connected to said first electrode protrudes on one side of said radiation detector and said electrical connection section of said conductive member connected to said second electrode protrudes on the other side of said radiation detector facing said one side.

8. The radiation detection module according to claim 6, wherein said electrical connection section of said conductive member connected to said first electrode and said electrical connection section of said conductive member connected to said second electrode protrude at different positions on the surface of said radiation detector facing said support substrate.

9. The radiation detection module according to claim 1, wherein said conductive members are attached to said first electrode or said second electrode so as to substantially cover the corresponding electrode surface.

10. The radiation detection module according to claim 9, wherein said conductive member is a tabular member.

11. The radiation detection module according to claim 1, wherein the plurality of said radiation detectors are arranged on said support substrate so that the electrical connection sections connected to electrodes of the same type substantially face each other in one direction.

12. The radiation detection module according to claim 1, wherein the plurality of said radiation detectors are arranged on said support substrate so that the electrodes of the same type face each other in a direction perpendicular to said one direction.

13. The radiation detection module according to claim 1, wherein said conductive members are conductive members having rigidity.

14. A radiation detection module comprising at least one radiation detector and a support substrate provided with said radiation detector,
   wherein said radiation detector comprises a plurality of radiation detector elements including a semiconductor region, a first electrode which collects a radiation detection signal and a second electrode which applies a bias voltage, both of which face each other with said semiconductor region interposed in between, said semiconductor region being disposed so as to cross said support substrate, and a plurality of conductive members,
   said plurality of radiation detector elements are arranged with said electrodes of the same type arranged in parallel facing each other, some of said plurality of conductive members are arranged between said electrodes of the same type facing each other and attached to these electrodes and the rest of said conductive members are attached to said first electrode or said second electrode which is singly disposed,
   said support substrate includes a plurality of conductive first connection members to which first conductive members which are said conductive members connected to said first electrode are attached, and a plurality of conductive second connection members to which second conductive members which are said conductive members connected to said second electrode are attached, said first connection members are arranged in two parallel rows between said second connection members in one direction, and a plurality of first wires connected separately to said plurality of first connection members are provided on said support substrate and a second wire connected to said plurality of second connection members and shared by said plurality of second connection members is provided on said support substrate.

15. The radiation detection module according to claim 14, wherein said first conductive members are attached to said first connection members and said second conductive members are attached to said second connection members using a conductive adhesive.

16. The radiation detection module according to claim 15, wherein said conductive adhesive is solder or thermoplastic adhesive.

17. The radiation detection module according to claim 14, wherein said first connection member is provided for each of said first conductive members and said second connection member is provided for each of a pair of said mutually facing second conductive members on said neighboring radiation detectors in said one direction.

18. The radiation detection module according to claim 14, wherein said first connection member is provided for each of said radiation detectors and said second connection member is provided so that said second conductive members of the plurality of said radiation detectors arranged in a direction perpendicular to said one direction are connected thereto.

19. The radiation detection module according to claim 14, wherein said first conductive member includes a first electrical connection section which protrudes outward from said semiconductor region and which forms part of said first conductive member, said second conductive member includes a second electrical connection section which protrudes outward from said semiconductor region and which forms part of said second conductive member, said first electrical connection section is attached to said first connection member and said second electrical connection section is attached to said second connection member.

20. A radiation detector comprising:
a semiconductor region;
a plurality of radiation detector elements having a first electrode which collects a radiation detection signal and a second electrode which applies a bias voltage, both of which face each other with said semiconductor region interposed in between; and
a plurality of metallic conductive members,
wherein said plurality of radiation detector elements are arranged in parallel with said electrodes of the same type placed facing each other,
some of said plurality of conductive members are arranged between mutually facing electrodes of the same type and attached to these electrodes and the rest of said conductive members 22, 23 are attached to said first electrode or said second electrode which is singly disposed without facing each other, and
said each conductive member includes an electrical connection section which forms part of said conductive member and which protrudes outward from said semiconductor region so as to serve as a fixing member for attaching said conductive member to other members.

21. The radiation detector according to claim 20, wherein the position at which said electrical connection section protrudes differs between said conductive member connected to said first electrode and said other conductive member connected to said second electrode.

22. The radiation detector according to claim 21, wherein said electrical connection section of said conductive member connected to said first electrode protrudes on one side of said radiation detector and said electrical connection section of said conductive member connected to said second electrode protrudes on the other side of said radiation detector which faces said one side.

23. The radiation detector according to claim 21, wherein said electrical connection section of said conductive member connected to said first electrode and said electrical connection section of said conductive member connected to said second electrode protrude at different positions on one surface of said semiconductor region on which neither first electrode nor second electrode is provided.

24. The radiation detector according to claim 20, wherein said conductive members are attached to said first electrode or said second electrode so as to substantially cover the corresponding electrode surface.

25. A radiological imaging apparatus comprising:
a plurality of radiation detection modules having a plurality of radiation detectors and a first support substrate provided with said radiation detectors, surrounding a bed which holds an examinee and arranged around said bed; and
an image information creation apparatus which creates images using information obtained based on radiation detection signals output from said radiation detectors,
wherein said radiation detector comprises a plurality of radiation detector elements including a semiconductor region, a first electrode which collects a radiation detection signal and a second electrode which applies a bias voltage, both of which face each other with said semiconductor region interposed in between, said semiconductor region being disposed so as to cross said support substrate, and a plurality of conductive members,
said plurality of radiation detector elements are arranged with said electrodes of the same type arranged in parallel facing each other, some of said plurality of conductive members are arranged between said electrodes of the same type facing each other and attached to these electrodes and the rest of said conductive members are attached to said first electrode or said second electrode which is singly disposed, and
said conductive members are attached to said first support substrate and connected to a wire provided on said first support substrate.

26. The radiological imaging apparatus according to claim 25, wherein each of said conductive members includes an electrical connection section which protrudes outward from said semiconductor region and which forms part of said conductive member and the structure of attaching said conductive member to said support substrate is realized by attaching said electrical connection section to said support substrate.

27. The radiological imaging apparatus according to claim 25, wherein the surface of said first support substrate to which said radiation detectors are attached is oriented in the longitudinal direction of said bed.

28. The radiological imaging apparatus according to claim 25, further comprising a signal processing unit including a second support substrate attached to said first support substrate in a freely detachable manner and an integrated circuit including a plurality of signal processing apparatuses which process radiation detection signals output from the plurality of said radiation detectors.

29. A radiological imaging apparatus comprising:
a plurality of radiation detection modules having a plurality of radiation detectors and a first support substrate provided with said radiation detectors, surrounding a bed which holds an examinee and arranged around said bed; and
an image information creation apparatus which creates images using information obtained based on a radiation detection signal output from said radiation detector,
wherein said radiation detector comprises a plurality of radiation detector elements including a semiconductor region, a first electrode which collects a radiation detection signal and a second electrode which applies a bias voltage, both of which face each other with said semiconductor region interposed in between, said semiconductor region being disposed so as to cross said support substrate, and a plurality of conductive members,
said plurality of radiation detector elements are arranged with said electrodes of the same type arranged in parallel facing each other, some of said plurality of conductive members are arranged between said electrodes of the same type facing each other and attached to these electrodes and the rest of said conductive members are attached to said first electrode or said second electrode which is singly disposed,
said first support substrate comprises a plurality of first conductive connection members to which first conductive members which are said conductive members connected to said first electrode are attached and a plurality of second conductive connection members to which second conductive members which are said conductive members connected to said second electrode are attached,
said first connection members are arranged in two parallel rows between said second electrode connection members in one direction, and
a plurality of first wires connected to said plurality of first connection members separately are provided on said first support substrate and second wires connected to said plurality of second connection members and shared by said plurality of second connection members are provided on said first support substrate.

30. The radiological imaging apparatus according to claim 29, wherein said first conductive member includes a first electrical connection section which protrudes outward from said semiconductor region and which forms part of said first conductive member,
said second conductive member includes a second electrical connection section which protrudes outward from said semiconductor region and which forms part of said second conductive member, and
said first electric connection section is attached to said first connection member and said second electrical connection section is attached to said second connection member.

31. The radiological imaging apparatus according to claim 29, wherein the surface of said first support substrate on which said radiation detectors are attached is oriented in the longitudinal direction of said bed.

32. The radiological imaging apparatus according to claim 29, further comprising a signal processing unit including a second support substrate attached to said first support substrate in a freely detachable manner and an integrated circuit including a plurality of signal processing apparatuses which process radiation detection signals output from the plurality of said radiation detectors.

33. A radiological imaging apparatus comprising:
a plurality of radiation detector;
an integrated circuit which processes radiation detection signals output from a plurality of said radiation detectors;
a support substrate to which said radiation detectors and said integrated circuit are attached;
a plurality of unit substrates surrounding a bed which holds an examinee and arranged around said bed; and
an image information creation apparatus which creates images using information obtained based on a radiation detection signal output from said integrated circuit,
wherein said radiation detector comprises a plurality of radiation detector elements including a semiconductor region, a first electrode which collects a radiation detection signal and a second electrode which applies a bias voltage, both of which face each other with said semiconductor region interposed in between, said semiconductor region being disposed so as to cross said support substrate, and a plurality of conductive members,
said plurality of radiation detector elements are arranged with said electrodes of the same type arranged in parallel facing each other, some of said plurality of conductive members are arranged between said electrodes of the same type facing each other and attached to these electrodes and the rest of said conductive members are attached to said first electrode or said second electrode which is singly disposed.

* * * * *